United States Patent [19]

Hugelshofer

[11] Patent Number: 4,564,530
[45] Date of Patent: Jan. 14, 1986

[54] PROCESS FOR THE PRODUCTION OF SOYA JELLY AND PRODUCT RESULTING THEREFROM

[75] Inventor: Alison Hugelshofer, Konolfingen, Switzerland

[73] Assignee: Nestec S. A., Vevey, Switzerland

[21] Appl. No.: 643,683

[22] Filed: Aug. 23, 1984

[51] Int. Cl.$^4$ .............................................. A23L 1/064
[52] U.S. Cl. ................................... 426/575; 426/399; 426/573; 426/634
[58] Field of Search ............... 426/573, 106, 656, 634, 426/399, 410, 576, 575

[56] References Cited

U.S. PATENT DOCUMENTS 2,963,373 12/1960 Monti et al. ........................ 426/575
3,809,768 5/1974 Berry .................................. 426/399
4,303,691 12/1981 Sand et al. .......................... 426/573

FOREIGN PATENT DOCUMENTS 7032909 10/1970 Japan ................................... 426/575

Primary Examiner—Raymond Jones
Assistant Examiner—Marianne M. Cintins
Attorney, Agent, or Firm—Vogt & O'Donnell

[57] ABSTRACT

An aqueous suspension containing 3–10% by weight of whole or defatted soya solids, 0.2–0.7% by weight of agar-agar and 0–12% by weight of sucrose is prepared, the suspension thus prepared is sterilized by heating and is then precooled to 40°–48° C., aseptically packed in hermetically sealed containers at 40°–48° C. and allowed to set by cooling in the containers.

5 Claims, No Drawings

PROCESS FOR THE PRODUCTION OF SOYA JELLY AND PRODUCT RESULTING THEREFROM

This invention relates to a process for the production of a soya jelly in a hermetically sealed pack in which an aqueous suspension of soya, agar-agar and sugar is heated and left to set while cooling.

It is known that agar-agar may be used to prepare a soya jelly. Among the hydrocolloids which might be considered suitable, several react with the soya proteins which gives rise to undesirable flocculation. Agar-agar is virtually the only hydrocolloid which lends itself to the preparation of a firm soya jelly having a crisp, light, moist, homogenous and smooth texture. Even with agar-agar, however, there is a still a real danger of flocculation. This makes it difficult to produce a jelly of the type in question, more particularly a long-life soya jelly aseptically packed in a hermetically sealed container, on an industrial scale.

The object of the present invention is to provide a process for the production of a soya jelly in a hermetically sealed pack on an industrial scale which is completely reliable and which avoids any danger of obtaining an imperfect texture.

To this end, the process according to the invention is characterized in that an aqueous suspension containing from 3 to 10% of whole or defatted soya solids, from 0.2 to 0.7% of agar-agar and from 0 to 12% of sucrose is prepared, the suspension thus prepared is sterilized by heating, precooled to 40°–48° C., aseptically packed in hermetically sealed containers at 40°–48° C. and left to set by cooling in the containers.

Throughout the present specification the percentages are by weight, systematically.

It is possible by the process according to the invention effectively to produce a soya jelly of perfect quality. There is now no longer any risk of the jelly assuming a flaky or granular texture, in addition to which the texture obtained is always sufficiently firm.

This is because it has been found that, by packing the jelly at a temperature above 48° C., incipient flocculation occurs and immediately spoils the appearance of the jelly and the sensation which it leaves in the mouth when pressed by the tongue against the palate. This sensation in the mouth should be entirely free from any granularity. The jelly should look smooth, cut smoothly and have a smooth taste. Thus, when it is packed at a temperature above 48° C., the jelly becomes punctuated with light spots which stand out against the uniform ivory white or colored background and its texture becomes sand-like.

It has also been found that, by packing the jelly at a temperature below 40° C., the texture obtained is too soft. An explanation which may be put forward for this phenomenon is that the setting process is already too advanced at those temperatures. By intervening physically with the packing operation during the setting process, formation of the jelly would be impeded and could no longer lead to a texture as firm as that obtained had it not been disturbed.

The starting material used for carrying out the process may be whole soya beans, optionally dehulled, soya flours which have optionally been defatted, soya concentrates or soya isolates. In other words, the soya may be used in all its forms. If a distinction is drawn in this description between whole and defatted soya solids, it is to underline the fact that it is possible to use both the products extracted from whole beans and those extracted from defatted cakes or flour. A suspension containing from 3 to 10% of those solids is then prepared. This range is centered around preferred values of 4–7% which are commonly encountered in products of this type in their country of origin. A range extended to include values below 3% or above 10% would lead to products which could be in danger of having little appeal to the consumer because either they would be too watery or, by contrast, too rich.

From 0.2 to 0.7% and preferably from 0.40 to 0.65% of agar-agar is incorporated in the suspension. The jelly is thus given the desired firmness. This firmness may be determined by means of a penetrometer, i.e. an instrument which measures the force required to make an element of predetermined shape, known as a plunger, penetrate at a certain speed and to a certain depth into the jelly. If, for example, a cylindrical plunger of which the flat end is 25.4 mm in diameter is made to penetrate into the jelly to a depth of 4 mm at a rate of 0.2 mm/s, it may be said that the force required for that purpose must be greater than about $147 \times 10^{-5}$ J for the preferred embodiment in which the jelly has an agar-agar content of from 0.40 to 0.65%.

In one embodiment of the process according to the invention, a very small quantity of a hydrocolloid other than agar-agar, more particularly from 0.02 to 0.06% of xanthan or from 0.1 to 0.2% of carrageenan, is additionally incorporated in the suspension. The object of this optional addition is to reduce the syneresis which might occur during storage or above all when the product is cut before serving, more particularly diced Chinese-style.

With regard to the sucrose, it is used above all for its unique organoleptic qualities in the present invention. It has virtually no bearing on the texture of the jelly providing it is used in the proportions indicated. It is also perfectly possible, if desired, to make a jelly without sugar. However, it is generally preferred to use sucrose in a proportion of from 6 to 12%.

To prepare said aqueous suspension, it is possible on the one hand to dry-mix with agar-agar and the sucrose and also the optional xanthan or carrageenan. On the other hand, the said whole or defatted soya solids may be dissolved or suspended in water to form a homogeneous liquid which will be referred to hereinafter as the soya presuspension. As mentioned above, it is possible to start with beans and directly to subject them to aqueous extraction in known manner, separating the insoluble fractions for example. It is also possible to start with a soya flour which has been defatted and to treat it in the same way. Finally, it is possible simply to dissolve or suspend a concentrate on an isolate. If it is desired to obtain a jelly texture which cuts really smoothly, steps are preferably taken to ensure that the presuspension contains sufficiently fine particles and, if necessary, it is homogenized in such a way that it does not leave any sandy sensation on the tongue. In one embodiment of the process according to the invention, for example whole soya beans, optionally dehulled, are used as the starting material and are treated in the manner described in GB-PS No. 1,553,008. The dry mixture of agar-agar and sucrose may then be added to the said soya presuspension and the whole stirred vigorously to obtain the said aqueous suspension.

The aqueous suspension may be sterilized by rapid heating at elevated temperature, for example for a few seconds at 140° C. or for a few tens of seconds at 125° C. The choice of the exact sterilization conditions does not affect the quality of the end product providing the heat treatment is sufficient for effectively obtaining sterilization, but is not continued for longer than necessary.

Once sterilized, the suspension is precooled to a temperature of from 40° to 48° C. and then aseptically packed at that temperature in a hermetically sealed container. In general, the container should be of such a form that the jelly can be removed therefrom as a single intact block. The container may be, for example, of the brick-shaped plastic-coated carton type varying in format with a capacity of, in particular, ¼, ½ or 1 liter. As mentioned above, the critical aspect of the precooling and packing operations lies in the range of temperatures indicated which have to be very closely monitored.

After it has been packed in the hermetically sealed container, the suspension sets in the container by continuing its cooling. It is possible for this cooling to take place on its own by adequate storage. However, it is imperative not to move the containers and to protect them against shock until the temperature of the jelly has fallen to ambient temperature, for example.

The process according to the invention is illustrated by the following Examples in which the percentages are by weight as indicated above.

EXAMPLE 1

To prepare a soya presuspension, dehulled beans which have been been broken up into a few fragments are ground in water at 90° C. The soya-water slurry is then treated by the injection of steam for 40 s at 140° C. and subsequently cooled to 80° C. by expansion. It is then finely ground, decanted and clarified to give the said soya presuspension.

Sucrose and agar-agar are dry-mixed and the resulting dry mixture is added to the soya presuspension with vigorous stirring to obtain said aqueous suspension. The respective quantities of the various ingredients are calculated in such a way that the suspension has the following composition:

soya solids: 4.5%
agar-agar: 0.6%
sucrose: 7.0%
water: 87.9%.

In a plate-type heat exchanger, the suspension is sterilized for 5 s at 140° C. and then precooled to 48° C. It is then aseptically packed at 48° C. in hermetically sealed containers of plastic-coated carton in the form of small bricks having a capacity of ¼ liter.

The bricks are then transported immediately to a place intended for their storage. The suspension sets in the container. Samples are taken after 2 days, 1 month, 3 months and 6 months. All the jellies may be removed from their containers in the form of a smooth compact block. The jellies are firm and pieces which cut perfectly smoothly may be removed therefrom with a spoon. Their texture is also smooth in the mouth, no irregularity being noticeable when the pieces are pressed between the tongue and the palate. The taste is delicious and stays substantially the same for 3 months. Only a very slight bitterness is noticed after 6 months. Also, the jelly has a pleasant ivory white color which it retains for a long time, turning only slightly beige after more than 3 months.

EXAMPLE 2

A soya presuspension is prepared in the same way as described in Example 1, except that the beans are ground in water at 50° C. and are treated by the injection of steam at 110° C.

Sucrose, agar-agar, xanthan and almond flavoring are dry-mixed. The resulting mixture is added to the presuspension with vigorous stirring. The quantities in which the various ingredients are used are calculated in such a way that the suspension thus obtained has the following composition, the balance being water:

soya solids: 4.5%
agar-agar: 0.5%
sucrose: 8.8%
xanthan: 0.05%
almond flavoring: 0.03%

In a plate-type heat exchanger, the suspension is sterilized for about 60 s at 125° C. and then precooled to 46° C. It is packed aseptically 46° C. in hermetically sealed containers of plastic-coated carton in the form of small ¼ liter bricks. The bricks are immediately transported to a place intended for their storage, being handled with care in the process. The suspension sets in the containers.

On tasting, the jelly has the same qualities as the jelly described in Example 1 apart from the fact that it has an almond flavor which replaces the relatively dicreet flavor of the "natural" jelly. Jellies flavored with other aromas, such as raspberry, rose, coconut, melon, gula melaka or pandan, for example, and colored may be prepared in the same way.

Also, the addition of xanthan greatly reduces the syneresis of the jelly which occurs when the jelly is served in diced form. The same reduction in syneresis may be obtained by using, for example, 0.15% of carrageenan instead of xanthan.

EXAMPLES 3–9 AND COMPARISON EXAMPLES

Various jellies are prepared in the same way as in Example 1 with certain parameters being varied, particularly the temperature to which the suspension is precooled, and are packed in hermetically sealed containers.

The results obtained are set out in the following Table. In the column headed "texture", a + sign indicates that the texture is crisp, light, moist, homogeneous and smooth whilst a − sign indicates that the texture is spoiled by flocculation as reflected in white spots against an ivory background and a sensation of coarse grain in the mouth. The column headed "firmness" shows the force required to make a cylindrical plunger having a flat end 25.4 mm in diameter penetrate to a depth of 4 mm into the jelly at a rate of 0.2 mm/s.

The corresponding values for the jellies of Examples 1 and 2 are also shown in that Table. The results obtained when the jellies are packed at temperatures which are too low or too high are also shown for comparison.

| Ex. No | Composition (%) Soya | Agar-agar | Sucrose | Xanthan | Packing temp. (°C.) | Firmness Texture | (J × $10^{-5}$) |
|---|---|---|---|---|---|---|---|
| 1 | 4.5 | 0.6 | 7 | — | 48 | + | 170 |
| 2 | 4.5 | 0.5 | 8.8 | 0.05 | 46 | + | 156 |

-continued

| Ex. No | Soya | Agar-agar | Sucrose | Xanthan | Packing temp. (°C.) | Firmness Texture | (J × $10^{-5}$) |
|---|---|---|---|---|---|---|---|
| 3 | 6 | 0.5 | 7 | 0.05 | 45 | + | 161 |
| C* | 6.5 | 0.4 | 7 | 0.02 | 54 | − | n.m.* |
| 4 | 6 | 0.5 | 7 | 0.05 | 40 | + | 152 |
| C* | 6 | 0.5 | 7 | 0.05 | 35 | + | 145 |
| C* | 4.5 | 0.6 | 7 | 0.05 | 32 | + | 131 |
| C* | 4.5 | 0.6 | 7 | — | 34 | + | 145 |
| 5 | 4.5 | 0.6 | 8 | 0.05 | 47 | + | 180 |
| 6 | 4.5 | 0.6 | 8 | 0.05 | 47 | + | 178 |
| C* | 4.5 | 0.6 | 9 | — | 50 | − | 178 |
| C* | 4.5 | 0.6 | 9 | 0.05 | 50 | − | 169 |
| 7 | 4.5 | 0.55 | 8 | 0.05 | 48 | + | 165 |
| 8 | 4.5 | 0.55 | 8 | 0.05 | 47 | + | 158 |
| 9 | 4.5 | 0.35 | 10 | 0.05 | 46 | + | n.m* |

C* = Comparison
n.m* = not measured

It can be seen from the above Table that the higher the temperature to which the jelly is precooled and aseptically packed in a hermetically sealed container, the more the firmness of the jelly increases. However, beyond 48° C., flocculation sets in.

By contrast, if the jelly is packed at a temperature below about 40° C., it can be seen that, for jellies having an agar-agar content in the preferred range of 0.40–0.65%, firmness falls below about 147×$10^{-5}$ J, which is considered the lower limit for this embodiment.

The jelly obtained in Example 9 is softer although perfectly set and has a texture bearing a considerable resemblance to that of tofu fah. Tofu fah is a type of soya curd greatly enjoyed in the Far East and prepared by coagulating soya milk with calcium sulfate. This resemblance makes the embodiment illustrated in Example 9 particularly interesting. The criticality of the range of precooling and packing temperatures applies to this embodiment also.

In the composition of the various jellies, the balance is water.

I claim:

1. A process for the production of a soya jelly in a hermetically sealed pack comprising the steps of preparing an aqueous suspension containing 3–10% by weight of whole or defatted soya solids, 0.2–0.7% by weight of agar-agar and 0–12% by weight of sucrose, sterilizing by heating the suspension thus prepared and then precooling it to 40°–48° C., aseptically packing it in hermetically sealed containers at 40°–48° C. and allowing it to set by cooling in the containers.

2. A process as claimed in claim 1, wherein the aqueous suspension additionally contains 0.02–0.06% by weight of xanthan.

3. A process as claimed in claim 1, wherein the aqueous suspension additionally contains 0.1–0.2% by weight of carrageenan.

4. A process as claimed in claim 1, wherein the aqueous suspension contains 4–7% by weight of whole soya solids, 0.40–0.65% by weight of agar-agar and 6–12% by weight of sucrose.

5. The jelly prepared by a process according to any preceding claim.

* * * * *